United States Patent Office 3,373,202
Patented Mar. 12, 1968

3,373,202
METHOD OF PREPARING TETRAETHYLAMMONIUM DECAHYDRODECABORATES
Joseph M. Makhlouf, Mars, and Gerald T. Heffernan, Butler, Pa., assignors to Callery Chemical Company, Pittsburgh, Pa., a corporation of Pennsylvania
No Drawing. Filed Sept. 14, 1966, Ser. No. 579,198
3 Claims. (Cl. 260—567.6)

This invention relates to a new method of preparing decahydrodecarborates and more particularly to their preparation by the thermal decomposition of octahydrotriborates.

Meutterties and Knoth, Chemical and Engineering News, May 9, 1966, pages 88 to 98, in reviewing the extensive chemistry of the polyhedral boranes, which are of unusual interest because of their aromatic character, note the particular importance of the decahydrodecaborate(-2) ion, $B_{10}H_{10}^{-2}$. Heretofore, decahydrodecaborates have been prepared from decaborane, $B_{10}H_{14}$, which is an extremely expensive starting material. The preparation of decahydrodecaborates by pyrolysis of octahydrotriborates is disclosed in the co-pending application Ser. No. 579,220 of Makhlouf and Hough filed on even date herewith.

It is therefore an object of this invention to provide a simple and direct method of preparing compounds containing decahydrodecaborate(-2) ion. Another object is to provide a method of preparing tetraethylammonium decahydrodecaborate by pyrolysis of tetraethylammonium borohydride.

In accordance with this invention, tetraethylammonium borohydride $(C_2H_5)_4NBH_4$, is pyrolyzed at a temperature above its decomposition temperature, about 185° C., under an inert non-oxidizing atmosphere, suitably nitrogen or argon. It is preferred to use temperatures below about 220° C., because at higher temperatures significant amounts of dodecahydrododecaborates are produced. The pyrolysis reaction proceeds substantially quantitatively according to the equation:

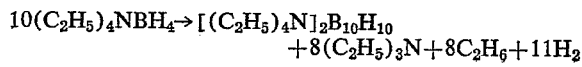

$10(C_2H_5)_4NBH_4 \rightarrow [(C_2H_5)_4N]_2B_{10}H_{10}$
$+ 8(C_2H_5)_3N + 8C_2H_6 + 11H_2$ Illustrative of this reaction, 5.69 grams (39.2 millimols) of $(C_2H_5)_4NBH_4$ were placed under a nitrogen atmosphere in a 250 ml. steel cylinder reactor equipped with a vent for discharging gases through a mercury trap and a wet test meter. The reactor was heated slowly to 185° C. and after 18 hours at this temperature, off-gassing ceased. Two liters of methane and hydrogen were produced compared to 1.95 liters theoretically expected from the above stated equation and triethylamine distilled from the reaction into the bubbler. The solid residue in the reactor was vacuum dried to yield 1.44 grams (3.8 millimols) of $[(C_2H_5)_4N]_2B_{10}H_{10}$, a 97% yield. The infrared spectrum of the product was identical to that of an authentic sample of $[(C_2H_5)_4N]_2B_{10}H_{10}$ prepared by the method of the aforementioned co-pending application of Makhlouf and Hough. The elemental analysis of the product was 29.51% B, 48.40% C, 13.79% H, and 7.21% N compared to the theoretical elemental content 28.54% B, 50.68% C, 13.3% H and 7.39% N.

According to the provisions of the patent statutes, we have explained the principle and mode of practice of our invention and have described what we now consider to represent its best embodiment. However, we desire to have it understood that, within the scope of the appended claims, the invention may be practiced otherwise than as specifically described.

We claim:
1. A method of preparing tetraethylammonium decahydrodecaborate comprising the steps of thermally decomposing tetraethylammonium borohydride under an inert non-oxidizing atmosphere and recovering the tetraethylammonium decahydroborate.
2. A method according to claim 1 in which the temperature is between about 180 and 220° C.
3. A method according to claim 1 in which the temperature is about 185° C.

No references cited.

CHARLES B. PARKER, *Primary Examiner.*
S. T. LAWRENCE III, *Assistant Examiner.*